United States Patent Office 3,592,664
Patented July 13, 1971

3,592,664
PROCESS FOR TREATING FRUIT SECTIONS
Murray Verlin, 1312 Collins Ave., Lakeland, Fla. 33803
No Drawing. Filed Feb. 28, 1968, Ser. No. 708,796
Int. Cl. A23b 7/00
U.S. Cl. 99—154                                              4 Claims

ABSTRACT OF THE DISCLOSURE

"Natural tasting" fruit sections are obtained by immersing in a sweetening solution within a container, sealing under steam to effect a certain range of vacuum, and heating to effect a low pressure under very controlled conditions of time and temperature.

---

This invention relates to the processing of citrus fruit sections, particularly orange and grapefruit sections, in a manner which retains the natural flavor, color and appearance while enabling preservation over extended periods of time with or without the use of preservatives.

Canning processes for citrus "sections," that is the pulp and juice or meat within the individual skinned segments of citrus fruit, has become exceedingly popular. The public has widely accepted the use of such sections for breakfast fruit, fruit dishes, and fruit salads. There is a yearning, however, for natural tasting citrus which, thus far, has defied the citrus processor's ingenuity. It appears that the sterilizing or pasteurizing process necessary to enable extended shelf life acts to degrade the natural flavor, color and texture. The use of preservatives further heightens this undesirable situation.

Many proposals to avoid one or all of the above deficiencies in current canning processes have been proposed, but to no avail. Reduced cooling temperature or cooling under a vacuum or pressure are favorite attempts but each causes a counteracting detriment, so that the net result is less than satisfactory. The sections either have a poor taste due to loss of volatile essential oil flavoring, or are mushy due to over cooking, or off-color, or shortly attain such, or have a "preservative" taste. The following U.S. patents all suffer from one or more of these: 2,755,190; 2,897,088; 2,906,628; 2,930,706; 3,245,807; 3,328,178. Accordingly, it is an object of this invention to provide a novel canning process for citrus sections.

Another object is to provide a process, of the above character, which does not need a preservative.

Still another object is to provide a process, of the above character, which retains the natural flavor of the fruit.

A further object is to provide a process, of the above character, which retains the natural color of the fruit.

A still further object is to provide a process, of the above character, which retains the texture of the raw fruit.

Another object is to provide a process, of the above character, which is economical.

Another object is to provide a process, of the above character, which lends itself to batch or continuous operation.

Other objects of the invention will in part be obvious and will in part appear hereinafter.

It has now been found that sections of citrus may be canned for extended shelf life while retaining their natural flavor, color and texture by immersing said sections in a sweetening solution within a container, sealing said container while maintaining a steam atmosphere in the head space in a manner such that a 10 to 15 inch and preferably an approximate 12 inch vacuum will be attained after sealing said container, then conveying said container through a heating bath to attain a temperature at an internal point spaced from the bottom center of the container ranging from 165 to 215° F., and preferably 165°, within twenty to sixty minutes and a low pressure of 15 to 25 p.s.i. and contents to a temperature of about 50° F. and then storing same at a reduced temperature.

The quick heating and cooling under low pressure uniquely accomplishes sterilization while avoiding loss of flavor, color and texture, and the meat substantially resembles the natural meat one encounters from fresh fruit.

The invention accordingly comprises the several steps and the relation of one or more of such steps with respect to each of the others thereof, and the article of manufacture possessing the features, properties, and the relation of elements which will be exemplified in the method and article hereinafter disclosed, and the scope of the invention will be indicated in the claims.

For a fuller understanding of the nature and objects of the invention, reference should be had to the following detailed examples:

EXAMPLE I

Oranges

Oranges are carefully selected from groves known to produce high quality fruit. The fruit is picked and hauled without bruising, and then aged in bins until it will peel properly.

The oranges then are carefully culled on final grading on the way to the peeling room. However, before peeling, and depending on the condition of the oranges, they are heated to above 125° F. at a point ¼ inch under the peel so that the peel may be easily removed without damage to the segments. The peeled fruit is then placed in wire baskets and submerged in or flooded over with lye solution (1–3% by weight) and at a temperature of approximately 190° F. to remove the albedo. The oranges are then spray rinsed of the lye solution and conveyed through a chilled water bath where they are chilled to about 60° F. The oranges are then sectionized and the sections placed in glass jars to a point approximately ¼ inch below the jar lip, together with sugar syrup (16° Brix) or artificially sweetened water (.2 to .5% by weight calcium or sodium cyclamate) with a stabilizer (propylene glycol alginate, guar gum or gum agacinth) and with or without preservatives (usually sodium benzoate) as desired.

The open jars are then passed under a device designated to displace a specific amount of the liquid portion of the pack to provide a predetermined head space which is 15–20 ml. in the case of pint (1 lb.) jars and 10 ml. for quart (2 lb.) jars. While maintaining a stream atmosphere in the head space, the jars are sealed with plastic gasketed metal lug caps, in such manner as to produce an approximately 12 inch. vacuum. The capped jars are conveyed through a hot water cooking bath for 29 minutes, the water temperature being maintained at 190° F. for pint jars and at 200° F. for quart jars. Under these cooking conditions, a pressure of about 20 to 25 p.s.i. will be attained in the jars of each size and a temperature of 160° to 165° F. is reached at an internal point in the product about two inches from the bottom center of the jar.

Subsequently, the jars are discharged from the cooker to a conveyor which delivers them to the entrance to a chiller after a travel time of five minutes. The temperature of the product in the jars at a point two inches above bottom center should remain approximately the same from discharge at the cooker to the entrance to the chiller. The jars are then slowly conveyed through the chiller under a series of water fogging nozzles starting at ambient temperature and they are gradually subjected to water sprays at lower temperatures so that they emerge from the chiller with a product temperature of approximately 50° F. The jars are then cased and trucked directly to a chill room or to ambient temperature storage.

After several months storage, the orange sections will be found to have a "natural" taste and texture and color. For product canned without the calcium lactate preservative, the product has an even closer "natural" taste.

EXAMPLE II

Grapefruit

In similar fashion to Example I, grapefruit are carefully selected from groves, hauled without bruising, and then aged in bins until proper peeling is possible.

After culling, and depending on the condition of the grapefruit, they are heated to above 125° F. at a point ¼ inch under the peel so that the peel may be easily removed without damage to the segments. The peeled fruit is then placed in wire baskets and submerged in or flooded over with lye solution (1-3% by weight) and at a temperature of approximately 170° to 190° F. to remove the albedo. The grapefruit are then spray rinsed of the lye solution and conveyed through a chilled water bath where they are chilled to about 60° F. Sections of the fruit are placed in glass jars to a point approximately ¼ inch below the jar lip, together with sugar syrup or artificially sweetened water with a stabilizer and with or without preservatives, as desired (see Example I for specific compounds). A predetermined head space of 15–20 ml. for pint (1 lb.) jars and 10 ml. for quart (2 lb.) jars is provided. Then while maintaining a steam atmosphere in the head space, the jars are sealed in such manner as to produce an approximately 12 inch vacuum. The capped jars are conveyed through a hot water cooking bath for 30 minutes, the water temperature being maintained at 190° F. for pint jars and at 200° F. for quart jars. Under these cooking conditions, a pressure of about 25 p.s.i. will be attained in the jars of each size and a temperature of 160° to 165° F. is reached at an internal point in the product about 2 inches from the bottom center of the jar.

Subsequently, the jars are slowly conveyed through a chiller under a series of water fogging nozzles starting at ambient temperatures and they are gradually subjected to water sprays at lower temperatures so that they emerge from the chiller with a product temperature of approximately 50° F. after ten minutes from hot to chilled condition. The jars are then cased and trucked directly to a chill room or to ambient temperature storage.

The grapefruit sections will, after storage, be found to be "natural," in taste, have excellent texture, and be golden yellow in color. The product canned without the sodium benzoate preservative will be even closer to a "natural" taste.

EXAMPLE III

Fruit salad

Select quality oranges and grapefruit are selected from fruit which has been picked and hauled without bruising. The fruit is first aged in bins until each piece of fruit will peel properly. The fruit selected is carefully culled on final grading. To aid in peeling, the fruit is heated to above 125° F. at a point ¼ inch under the peel, the exact temperature depending on the condition of the fruit. Thus, the peel is easily removed without damage to the segments.

The peeled sections are then placed in wire baskets and submerged in or flooded over with lye solution (1-3% by weight) and at a temperature of approximately 190° F. to remove the albedo. The fruit is then spray rinsed of the lye solution and conveyed through a chilled water bath to chill it to about 60° F. It is then sectionized and the sections placed in glass jars to a point approximately ¼ inch below the jar lip, together with sugar syrup or artificially sweetened water with a stabilizer and with or without preservatives, as desired. Several maraschino cherries and canned pineapple sections are added along with the orange and grapefruit sections. A head space of 15–20 ml. for pint (1 lb.) jars and 10 ml. for quart (2 lb.) jars is provided. Then, while maintaining a steam atmosphere in the head space, the jars are sealed with plastic gasketed metal lug caps, in such manner as to produce an approximate 12 inch vacuum. The capped jars are conveyed through a hot water cooking bath for 29 minutes, the water temperature being maintained at 190° F. for pint jars and at 200° F. for quart jars. Under these cooking conditions, a pressure of about 20 to 25 p.s.i. will be attained in the jars of each size and a temperature of 160° to 165° F. is reached at an internal point in the product about 2 inches from the bottom center of the jar.

Subsequently, the jars are slowly conveyed through a chiller under a series of water fogging nozzles starting at ambient temperature and they are gradually subjected to water sprays at lower temperatures so that they emerge from the chiller with a product temperature of approximately 50° F. after sixty minutes from hot to chilled condition. The jars are then cased and trucked directly to a chill room or to ambient temperature storage.

The fruit salad so made will, after extended storage, be found to have a "natural" taste. For products canned without the sodium benzoate preservative, the product has an even closer "natural" taste.

The fruits that may be treated in accord with the process of this invention are oranges, valencias, grapefruit, tangerines, tangelos, apples, pineapple, grapes, peaches, pears, cantaloupe, honeydew, watermelon, bananas and mixtures thereof, with possibly some modification with respect to sectionizing.

For all such fruits, the heat treatment should involve a temperature at an internal center point in the fruit ranging from 160° to 215° F. and, in all instances, no greater than 215° F. and preferably 165° F.

The container in which the fruit is placed should attain a pressure of 15 to 25 p.s.i. during heat treatment with a finished vacuum of 10 to 15 inches in the cold container.

The overall time of heat treatment should not exceed sixty minutes.

It will thus be seen that the objects set forth above, among those made apparent from the preceding description, are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall thereinbetween.

Now that the invention has been described, what is claimed is:

1. A method for the preservation of citrus fruit sections comprising immersing said sections in a sweetening solution within a container, then providing a head space in said container, then sealing said container while maintaining a steam atmosphere in the head space and wherein a 10 to 15 inch vacuum is attained after sealing said container, then conveying said container through a heating bath to attain a temperature of about 165° F. at an internal center point in the fruit spaced from the bottom center of the container in twenty to sixty minutes with a low pressure of 15 to 25 p.s.i. within the container, then quick chilling said container and contents to a temperature of about 50° F. and then storing same at a reduced ambient temperature.

2. The method of claim 1 wherein said citrus fruit sections comprise oranges.

3. The method of claim 1 wherein said citrus fruit sections comprise grapefruit.

4. The method of claim 1 wherein said citrus fruit sections comprise a fruit salad mixture of oranges, grapefruit, pineapple and maraschino cherries.

References Cited

UNITED STATES PATENTS

| | | | |
|---|---|---|---|
| 2,700,614 | 1/1955 | Critzman | 99—186 |
| 2,755,190 | 7/1956 | Oyler | 99—186X |
| 2,874,059 | 2/1959 | Powers et al. | 99—186 |
| 2,930,706 | 3/1960 | Moulton | 99—172X |
| 2,992,114 | 7/1961 | Weaver | 99—154 |
| 3,086,868 | 4/1963 | Keifer | 99—103 |
| 3,019,113 | 1/1962 | Rooker | 99—186 |
| 3,245,807 | 4/1966 | Colby | 99—172X |
| 3,396,040 | 8/1968 | Cohen | 99—186 |

FOREIGN PATENTS

| | | | |
|---|---|---|---|
| 524,877 | 1940 | Great Britain | 99—186 |

NORMAN YUDKOFF, Primary Examiner

F. E. DRUMMOND, Assistant Examiner

U.S. Cl. X.R.

99—186, 193 211, 216

PO-1050
(5/69)

UNITED STATES PATENT OFFICE
CERTIFICATE OF CORRECTION

Patent No. 3,592,664　　　　　　　Dated July 13, 1971

Inventor(s) Murray Verlin

It is certified that error appears in the above-identified patent and that said Letters Patent are hereby corrected as shown below:

Column 2, line 10, after "25 p.s.i.", insert -- within the container, then quick chilling said container --- line 57, delete "stream" and insert -- steam --

Signed and sealed this 18th day of January 1972.

(SEAL)
Attest:

EDWARD M. FLETCHER, JR.
Attesting Officer

ROBERT GOTTSCHALK
Acting Commissioner of Patents